Figure 1:
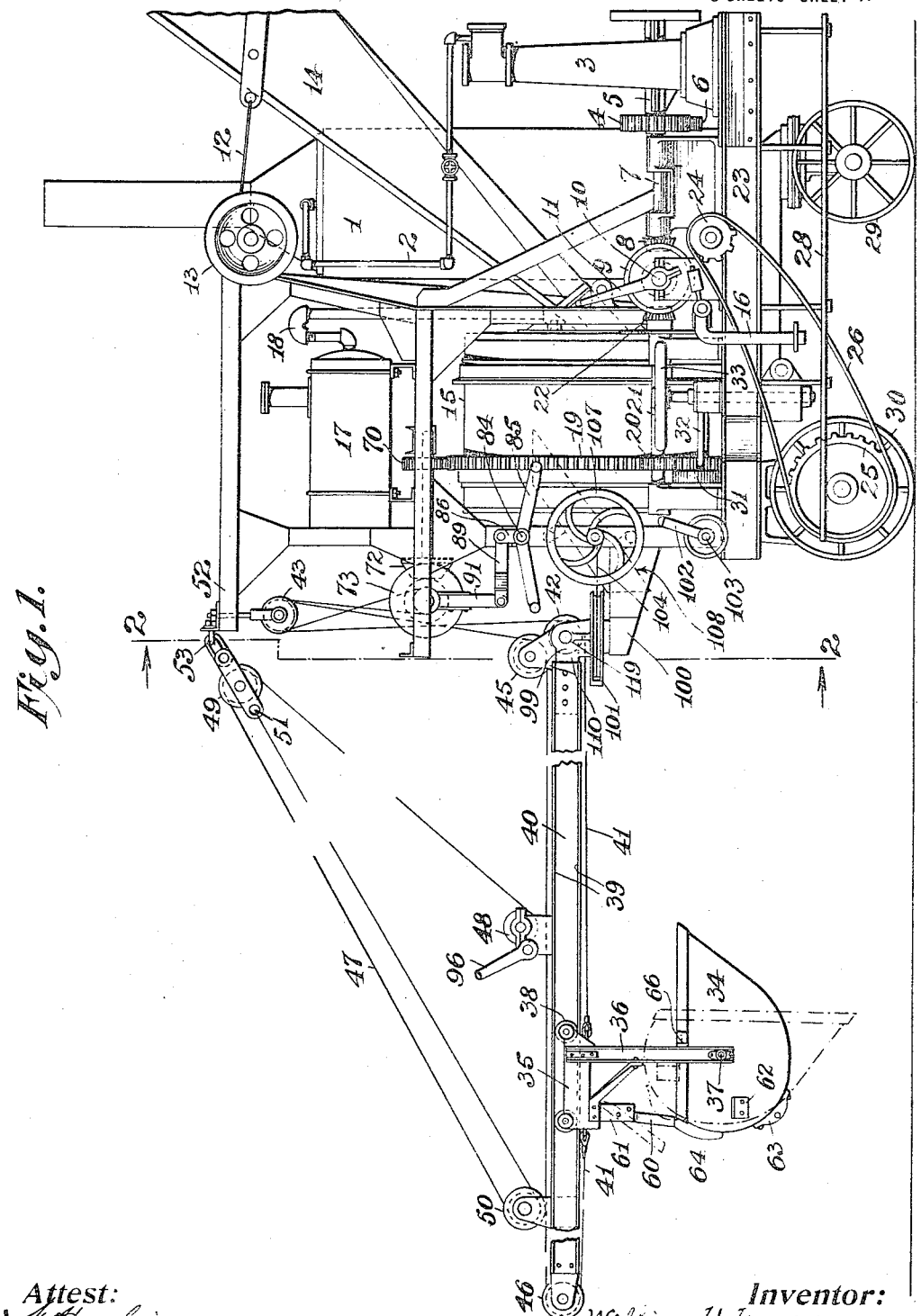

W. H. HUDSON.
CONCRETE PAVING MACHINE.
APPLICATION FILED NOV. 23, 1916.

1,289,782.

Patented Dec. 31, 1918.
5 SHEETS—SHEET 1.

Attest:
N. O. McGinn

Inventor:
William H. Hudson
by
S. J. Cox, Atty.

W. H. HUDSON.
CONCRETE PAVING MACHINE.
APPLICATION FILED NOV. 23, 1916.

1,289,782.

Patented Dec. 31, 1918.
5 SHEETS—SHEET 3.

Attest: M.C.McGinn

Inventor: William H Hudson
by F. L. Cox, Atty.

W. H. HUDSON.
CONCRETE PAVING MACHINE.
APPLICATION FILED NOV. 23, 1916.
1,289,782.
Patented Dec. 31, 1918.
5 SHEETS—SHEET 4.
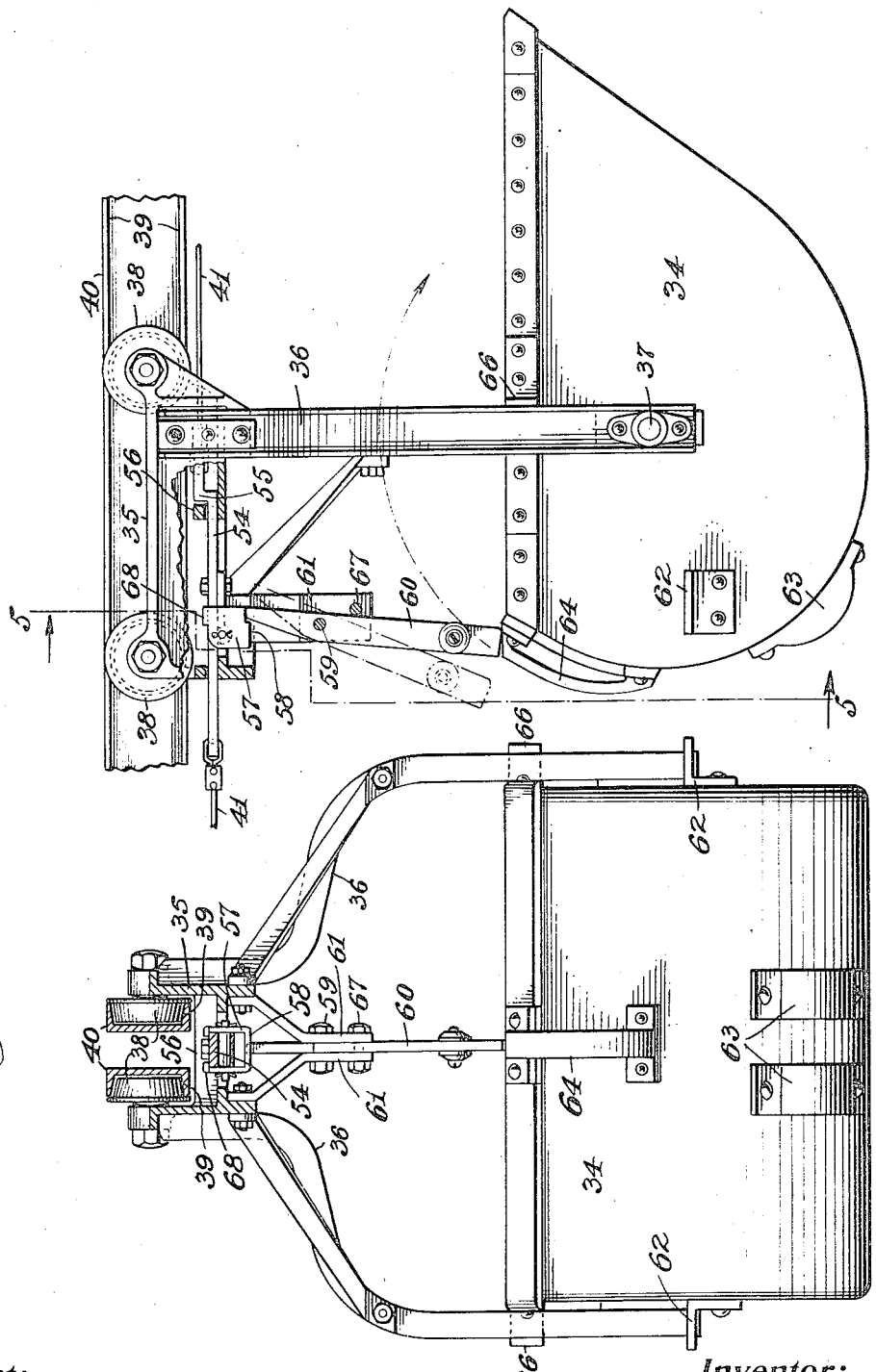

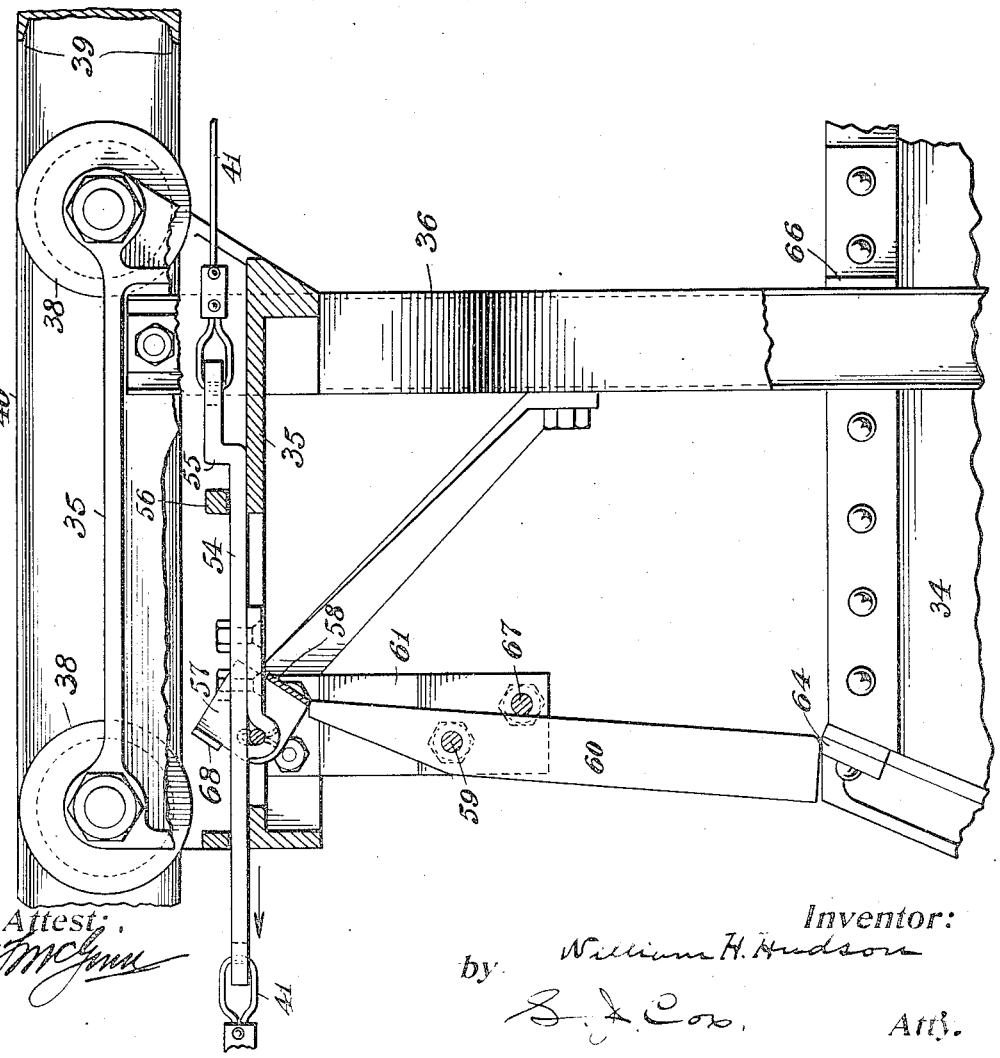

UNITED STATES PATENT OFFICE.

WILLIAM H. HUDSON, OF PLAINFIELD, NEW JERSEY, ASSIGNOR TO RANSOME CONCRETE MACHINERY COMPANY, OF NEW YORK, N. Y., A CORPORATION OF NEW YORK.

CONCRETE-PAVING MACHINE.

1,289,782.  Specification of Letters Patent.  Patented Dec. 31, 1918.

Application filed November 23, 1916. Serial No. 132,934.

*To all whom it may concern:*

Be it known that I, WILLIAM H. HUDSON, a citizen of the United States, and a resident of the city of Plainfield, in the county of Union, State of New Jersey, have invented certain new and useful Improvements in Concrete-Paving Machines, of which the following is a specification.

The improvements relate to paving machines adapted to mix and distribute concrete or the like for the purpose of making a road or other pavement, and their objects are, among others, to produce a machine of this class in which the materials are taken up, mixed, discharged, distributed and placed, by a combination of devices arranged to be operated from a common source of power; to so arrange the various operative parts that they will coördinate or may be coördinated and controlled by a single operator to the production of the desired result; to prevent injury to the gears or other parts by accident or interference with the operation of any of the mechanism; and to so arrange the distributing mechanism that its action is largely automatic and not only distributes and deposits the mixed concrete at the proper point, but also aids in the spreading of the same. Other objects and advantages will appear to those skilled in the art.

In the mechanism herein described and shown the concrete aggregates are taken up from the ground or other point by a pivoted charging hopper, deposited in the rotary mixer, the bath supplied with the desired amount of water, mixed and discharged into a traveling bucket or tub and the said bucket caused to travel along a boom to the desired point, then dumped and spread and the bucket restored to its normal position and returned to the mixer for another charge, all of the mechanisms taking part in these operations being operated by a single engine of the reversible marine type and controlled by an operator from the running board of the machine. The truck carrying the machine is also caused to travel and supplied with power from the same source. The combination of a pivoted charging hopper, mixer and distributing bucket traveling on a boom or the like provided with means for raising and lowering it and moving it laterally to various positions is not claimed broadly herein, such apparatus being shown in Patent No. 782,052, to E. L. & A. W. Ransome, of February 7, 1905. Various other parts of the mechanism are also common in the art. The invention of the present improvements resides in the construction, combination and arrangement of these parts with other parts hereinafter described and claimed and illustrated in the accompanying drawings.

Figure 2:
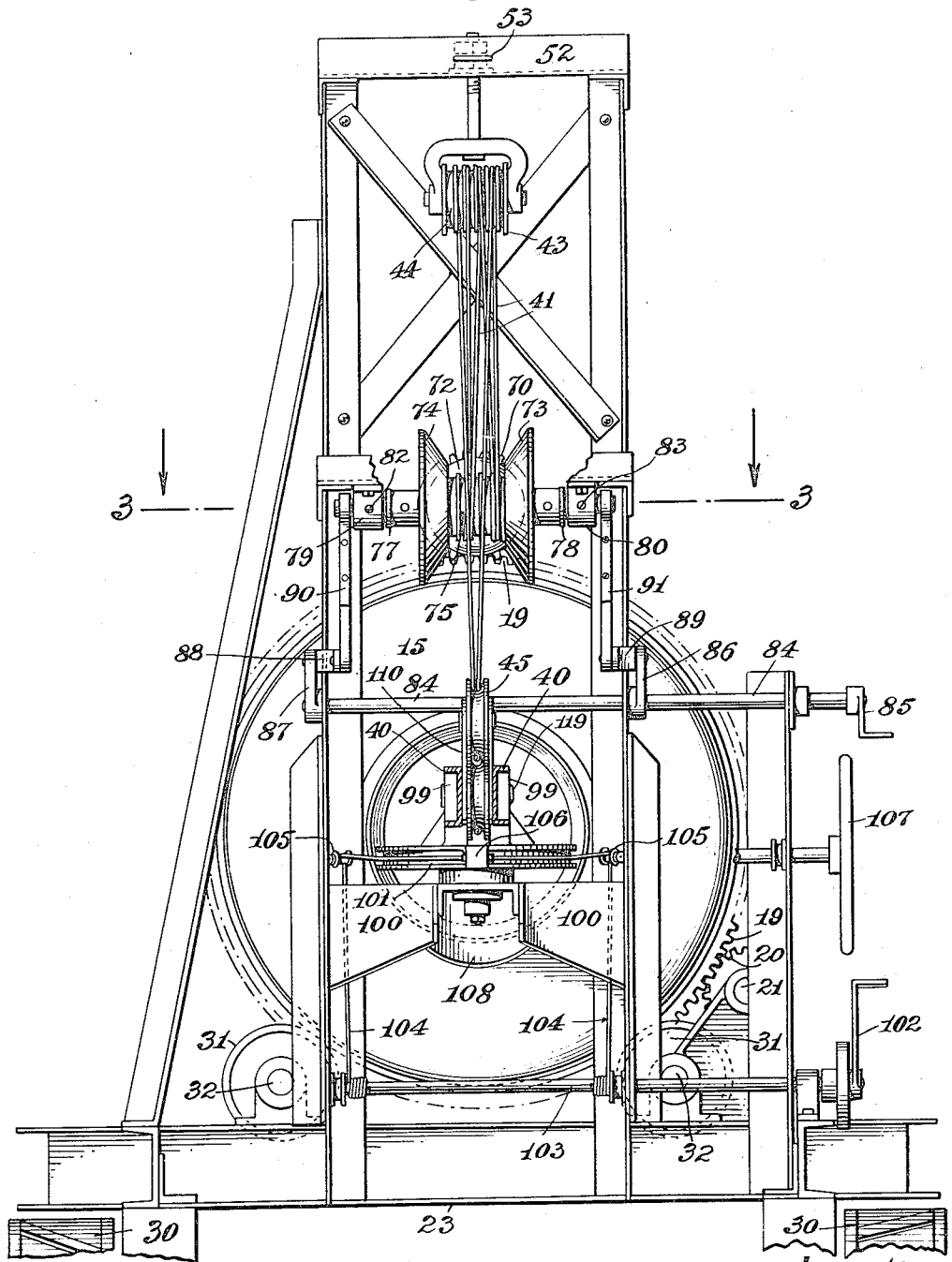
Figure 3:
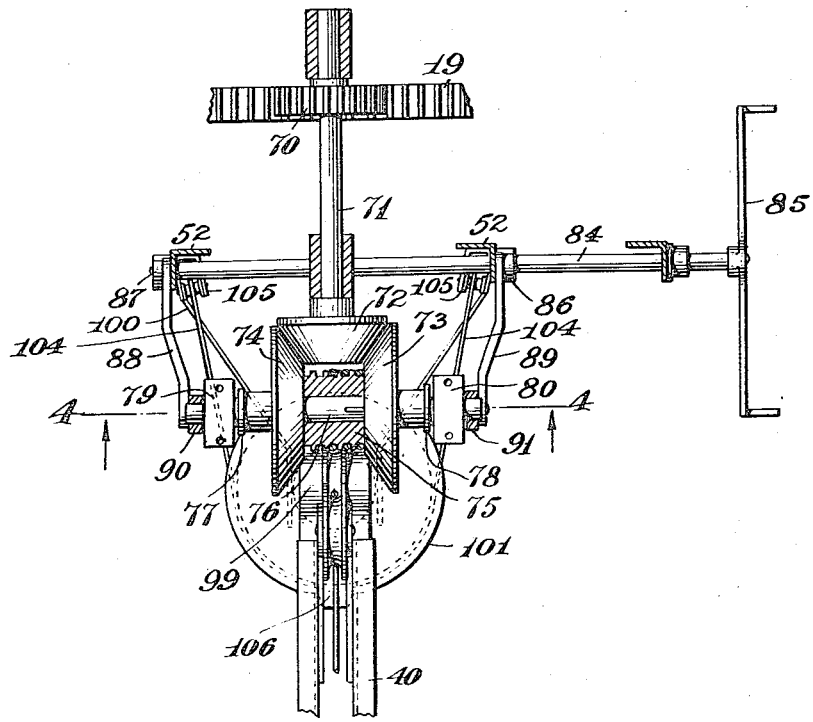
Figure 4:
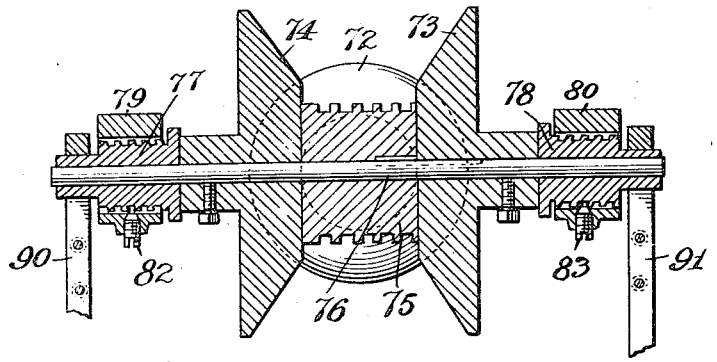

In the drawings, Figure 1 is a side elevation of a concrete paving machine embodying the improvements; Fig. 2 is a vertical section substantially on the lines 2—2 of Fig. 1, looking in the direction indicated by the arrows in that figure and showing some of the parts back of that line in end elevation; Fig. 3 is a horizontal section on the line 3—3 of Fig. 2, looking in the direction indicated by the arrows in that figure and showing the beveled friction gears, clutch and adjacent parts; Fig. 4 is a vertical section on the line 4—4 of Fig. 3, looking in the direction indicated by the arrows in that figure and showing the friction beveled gears and other parts on an enlarged scale. Fig. 5 is an end elevation of the traveling bucket with its trip and carriage, looking from the outer extremity of the boom on which it travels, the track and portions of the carriage being shown in vertical cross-section, as indicated by the line 5—5 in Fig. 6; Fig. 6 is a side elevation of the same parts shown in Fig. 5, some of the said parts being broken away to expose others behind them to view; Fig. 7 is an enlarged detail of the bucket carriage and trip with adjacent parts, some of the latter being shown in vertical longitudinal section; Fig. 8 is a top plan of the winch for adjusting the height of the boom; Fig. 9 is a side elevation of the same.

Steam is supplied by the boiler 1 to the reversible marine-type engine 3 through the steam pipe 2. The shaft 5 of the engine has a gear 4 which meshes with a pinion 6 on the main drive shaft 7. On the end of this shaft is a beveled gear 8 which meshes with the gear 9 keyed to the shaft 10 of the pivoted charging hopper hoist. A clutch lever 11 connects the winding drum with the gear 9 and thereby operates and disconnects from the power shaft the cable 12 running over the sheave wheel 13, whereby the pivoted charging hopper 14 is raised and dumped into the mixer 15. A brake 16 retards the descend of the hopper after unloading by applying friction to the drum on the shaft 10 through a band operated thereby.

The tank 17 supplies water to the mixture through the pipe 18, and the mixer is rotated by means of the peripheral annular rack 19 meshing with the pinion 20 on the end of the shaft 21, on the opposite end of which is a beveled pinion 22 meshing with the gear 9 and thereby transmitting power from the shaft 7 to the mixer.

The truck 23 is propelled when desired by means of the sprockets 24 and 25 and endless chain 26 operated by the lever 27. All these devices, and the devices for controlling the operation of the boom and bucket are under the control of the operator, who stands on the running board 28 suspended from the truck, which runs on wheels 29 and 30. The mixer is supported on the traction wheels 31 rotatably mounted in bearings on the truck frame and connected by the shaft 32. A steering wheel 33 is also provided for the purpose of directing the travel of the carriage.

The discharging and placing bucket 34 is hung from the carriage 35 by the two-part bail 36, to the lower ends of which it is pivoted as shown at 37. The carriage 35 has wheels 38—two on each side—running on the flanges 39 of the boom 40, which consists of two channel beams secured together, and its movement backward and forward is accomplished by means of a cable 41 secured thereto, as hereinafter described, and running over the sheave 42, drum 43, with grooves 44, and winding drum 75, and back from the said drum over the drum 43 again and then over the sheaves 45 and 46, the latter at the outer end of the boom. It will be seen that rotation of the drum 75 therefore moves the bucket backward and forward on the boom by winding and unwinding the cable in one direction or the other and causing it to travel correspondingly. The elevation of the boom is adjusted by means of the line 47 secured thereto by means of the winch 48 and running over the pulleys 49 and 50, and having its opposite end secured to the pulley frame 51 which is in turn secured to the frame 52 of the machine by a hook 53. By drawing or slacking the rope 47 the boom is raised and lowered, and its position is secured by means of the winch 48.

The bucket is automatically tripped in the following manner. When the cable 41 moves to draw the bucket outwardly it first moves the reciprocating bar 54 connecting its two ends and passing through the carriage 51, until the offset 55 presses against the horizontal arm 56, fixed to the carriage, through the slot of which the said bar 54 passes, and propels the carriage and bucket. When the bucket has reached the desired point on the boom the cable is reversed and the bar 54 pulled forward. This causes the bottom horizontal part 58 of the stirrup-shaped tripping dog 57, pivoted to said bar, to engage the upper end of the trip latch 60 pivoted at 59 on the hanger 61, depending from the carriage 35. This rocks the said trip on its pivot and causes its lower end to move from the shoe 64 on the rear edge of the bucket 34 and permits the said bucket to rock on its pivot (see dotted lines Figs. 1 and 6). As the bucket when loaded is overbalanced so that it will automatically turn to its dumping position this accomplishes the discharge of its load. The return of the bucket to its normal position is caused by the weight 63 on the opposite side of the pivot from the lip. A stop 62 limits the forward or dumping movement of the bucket and a stop 66 checks its return movement. As soon as the bucket has been tripped and has discharged its contents, and as soon as its outer edge or lip is free from the contents which have been deposited on the ground it returns to its normal position and is held there by the trip 60, which falls into its normal retaining position by gravity and is held in this position by the stop 67. The bucket starts its return movement immediately after it is tripped and therefore moves toward the mixer as it discharges its load. This causes the said load to be spread on the ground evenly, on account of the backward movement of the bucket as it discharges its contents and the plowing of the lip therethrough. When the cable is reversed to move the bucket outwardly again the stirrup-shaped member 57 rocks on its pivot and permits the bottom part 58 thereof to slide over the upper end of the trip 60 and then assume its position ready to again release the said trip. In this latter operation it is prevented from moving outwardly by the ears 68 extending over the bar 54.

The mechanism for operating the cable consists of a pinion 70 meshing with the rack 19 of the mixer and mounted on a shaft 71 with a beveled friction gear 72 keyed to its outer extremity. This friction gear 72 meshes in turn with the bevels 73 and 74 to rotate the cable winding drum 75 keyed to their shaft 76, causing it to rotate in one direction or the other and thus move the cable backward and forward. The bevels 73 and 74 are thrown into and out of engagement with the bevel 72 by means of clutches consisting of spools 77 and 78 provided with right and left hand threads respectively, and mounted in collars 79 and 80 having bearings therefor and having adjustable pins 82 and 83 engaging their threads. The shaft 84 is provided with a double crank 85 by which it may be rotated in one direction or the other and the arms 86 and 87 are rocked thereby causing the links 88 and 89 to turn the arms 90 and 91 keyed to the end of the spools 77 and 78 and turn the said spools to a sufficient extent to move one or the other of the said gears into contact with the gear 72.

The boom 40 is pivotally mounted on the bracket 100 and is given oscillating movement on its pivot by means of the grooved wheel 101 keyed thereto and receiving the cables 104 wound on the shaft 103 which is mounted in suitable bearings and rotated by the crank 102. As the ends of the cable are secured to the clamp 106 and pass around opposite grooved sides of the wheel 101, the rotation of the shaft in one direction or the other and the winding and unwinding of the cable ends thereby causes the boom to swing in one direction or the other through an arc of 180 degrees so that the bucket may be dumped at any point within the area of the segment traversed thereby. The cable 104 passes over grooved guiding rollers 105 between the wheel 106 and the winding shaft 103 and as these guiding rollers are located back of the wheel 101, the cables have sufficient play to cause the oscillation of the boom to the desired extent.

The boom is permitted to move vertically by the pivot 119, which is also the axle on which the boom 42 rotates, being connected with the said pivot by means of the plate 110 to which the said boom is riveted.

The contents of the mixer 15 are discharged into the bucket 34 by means of the wheel 107 tilting the discharge chute 108 to its charging or discharging position. In Fig. 1 of the drawings this chute is shown in its discharging position with the bucket near the outer end of the boom and the charging hopper 14 of the mixer in position to charge the same. But before the charge enters the mixer the chute should be tilted to its opposite position.

What I claim is:

1. The combination with a suitable support and a concrete mixer, of a boom mounted adjacent to the mixer, a cable mounted to travel lengthwise of said boom, a power device for operating said cable, a carriage mounted to travel along said boom and a connection between said carriage and cable whereby the carriage is moved in both directions, said connection comprising a stop on the carriage, a stop-engaging member carried by the cable and located on one side of the stop, and means whereby the movement of said stop-engaging member away from said stop is limited and the cable caused to engage the carriage, a pivoted bucket suspended from said carriage and a bucket-tripping device carried by the cable, constructed and arranged to operate on the last named movement of the cable.

2. The combination with a suitable support and a concrete mixer, of a boom mounted adjacent to the mixer, a cable mounted to travel lengthwise of said boom, a power device for operating said cable, a carriage mounted to travel along said boom and a connection between said carriage and cable whereby the carriage is moved in both directions, said connection comprising a stop on the carriage, a stop-engaging member carried by the cable and located on one side of the stop, and means whereby the movement of said stop-engaging member away from said stop is limited and the cable caused to engage the carriage, a pivoted bucket suspended from said carriage and a bucket-tripping device carried by the cable, constructed and arranged to operate on the last named movement of the cable, said bucket-tripping device comprising a pivoted member carried by the carriage and engaging the bucket on one side of its pivot, a rocking member mounted on the cable adapted to engage the said pivoted member and move it from engagement with the bucket when the cable is moved in one direction and to rock and pass over the said member when moved in the opposite direction, the construction and arrangement being such that the carriage and bucket are moved in one direction to engagement of the stop and stop-engaging member without releasing the bucket, and the bucket is released on the movement of the cable in the opposite direction and the carriage and bucket then moved bodily along the boom.

3. The combination with a suitable support and a concrete mixer, of a boom mounted adjacent to the mixer, a cable mounted to travel lengthwise of said boom, a power device for operating said cable, a carriage mounted to travel along said boom, a bucket pivotally mounted on said carriage, a flexible connection between said cable and carriage permitting limited movement of the cable with respect thereto, a pivoted member carried by the carriage and engaging the bucket on one side of its pivot, and means carried by the carriage for releasing the said member from engagement with the bucket on the said limited movement of the cable with respect to the carriage in one direction, said means being inoperative to release the said member on the said movement of the cable in the opposite direction.

4. The combination with a suitable support and a concrete mixer, of a boom mounted adjacent to the mixer, a cable mounted to travel lengthwise of said boom, a power device for operating said cable, a carriage mounted to travel along said boom, a bucket pivotally mounted on said carriage, a flexible connection between said cable and carriage permitting a limited movement of the cable with respect thereto, a pivoted member carried by the carriage and engaging the bucket on one side of its pivot, means carried by the carriage for releasing the said member from engagement with the bucket on the said limited movement of the cable with respect to the carriage in one direction, said means being inoperative to release the said member on the said movement of the cable in the opposite direction, said releasing means comprising a member movably mounted on the carriage, a stop limiting the movement of the bucket-engaging member in one direction from its engaging position, a portion of said member being in the path of the said movable member carried by the carriage, the construction and arrangement being such that the said movable member is moved and caused to pass over the portion of the bucket-engaging member when the cable is moved in one direction and engages the said portion in its path and moves the said member from engagement with the bucket when the cable is moved in the opposite direction.

5. The combination with a suitable support and a concrete mixer, of a boom mounted adjacent to the mixer, a cable mounted to travel lengthwise of said boom, a power device for operating said cable, a carriage mounted to travel along said boom, a bucket pivotally mounted on said carriage, a flexible connection between said cable and carriage permitting limited movement of the cable with respect thereto, a pivoted member carried by the carriage and engaging the bucket on one side of its pivot, means carried by the carriage for releasing the said member from engagement with the bucket on the said limited movement of the cable with respect to the carriage in one direction, said means being inoperative to release the said member on the said movement of the cable in the opposite direction, said releasing means comprising a member carried by the carriage in the path of a portion of the bucket-engaging member and provided with a stop preventing its movement from said path in one direction, said member being movable from said path and adapted to move from said path on coming in contact with said portion when moved in the opposite direction.

6. The combination with a suitable support and a concrete mixer, of a boom mounted adjacent to the mixer, a cable mounted to travel lengthwise of said boom, a power device for operating said cable, a carriage mounted to travel along said boom, a bucket pivotally mounted on said carriage and adapted to be moved therewith by the cable to and from the mixer, said bucket having an opening at its upper part and being closed at its bottom and sides and extending a greater distance on the side of its pivot toward the mixer than the other, means for holding the bucket normally in position with the opening at its upper part, means for releasing the bucket-holding means on the movement of the bucket toward the mixer and for restoring said bucket to its normal position after it has discharged its contents, whereby the bucket may be emptied automatically and its extending portion caused to move through the discharged load at a point below the level of its normal bottom.

7. The combination with a suitable support and a concrete mixer, of a boom mounted adjacent to the mixer, a cable mounted to travel lengthwise of said boom, a power device for operating said cable, a carriage mounted to travel along said boom, a bucket pivotally mounted on said carriage and adapted to be moved therewith by the cable to and from the mixer, said bucket having an opening at its upper part and being closed at its bottom and sides and extending a greater distance on one side of its pivot than the other, whereby, when loaded it will have a tendency to rock on its pivot and permit its contents to be discharged from the said open portion, means for holding the bucket normally in position with the opening at its upper part, means for releasing the bucket-holding means on the movement of the bucket toward the mixer and for restoring said bucket to its normal position after it has discharged its contents, said bucket-releasing means comprising a member movably mounted on the carriage and engaging the bucket on one side of its pivot to hold it in its normal position and a tripping device carried by the cable into the path of which a portion of the said movable bucket-engaging member extends, said tripping device being mounted to move over the said portion when the cable is operated in one direction and to engage the same and release the bucket when the cable is operated in the opposite direction.

8. The combination with a suitable support and a concrete mixer, of a boom mounted adjacent to the mixer, a cable mounted to travel lengthwise of said boom, a power device for operating said cable, a carriage mounted to travel along said boom, a bucket mounted on said carriage and movable therewith by means of the cable to and from the mixer, a drum on which said cable is wound, and friction gears intermediate said drum and the power device, a bucket-tripping device carried by the cable, comprising a movable member thereon, a movable member mounted on the carriage engaging the bucket, extending into the path of said device carried by the cable, and adapted to move it aside when the cable is operated to move the carriage and bucket away from the mixer.

9. The combination with a suitable support and a concrete mixer, of a boom mounted adjacent to the mixer, a cable mounted to travel lengthwise of said boom, a power device for operating said cable, a carriage mounted to travel along said boom, a bucket pivotally mounted on said carriage and to be moved therewith to and from the mixer by said cable, and means for normally maintaining said bucket in an upright concrete-holding position and for releasing the same and permitting it to discharge its load, comprising a latch pivotally mounted on the carriage and engaging the bucket on one side of its pivot, a stop preventing the movement of said latch in one direction from engagement with the bucket, a tripping device carried by the cable and adapted to move the said latch from engagement with the bucket on movement of the cable in the direction of the mixer, said tripping device extending normally into the path of the latch, but being movable therefrom when the cable moves away from the mixer to pass the said latch, having a stop preventing its movement from normal position in the opposite direction, and being balanced to return at all times when released to said normal position.

10. The combination of a bucket, a pole or boom horizontally disposed on which the said bucket is mounted to travel, means for moving the said bucket to and fro thereon, and means for causing the said bucket to tilt and discharge its contents in the direction in which the said bucket is moving, and causing a portion of the bucket to move over the discharged contents to spread the same.

11. The combination of a bucket, a pole or boom horizontally disposed on which the said bucket is mounted to travel, means for moving the said bucket to and fro thereon, and means for causing the said bucket to tilt and discharge its contents in the direction in which the said bucket is moving, and causing a portion of the bucket to move over the discharged contents, and means for raising and lowering the said pole or boom and the bucket thereon from and toward the surface on which the said contents are discharged.

Witness my hand this 13th day of November, 1916, at the city of New York, in the county and State of New York.

WILLIAM H. HUDSON.